Jan. 29, 1952     N. BASHARK ET AL     2,583,539
VALVE PACKING CONSTRUCTION
Filed June 5, 1946
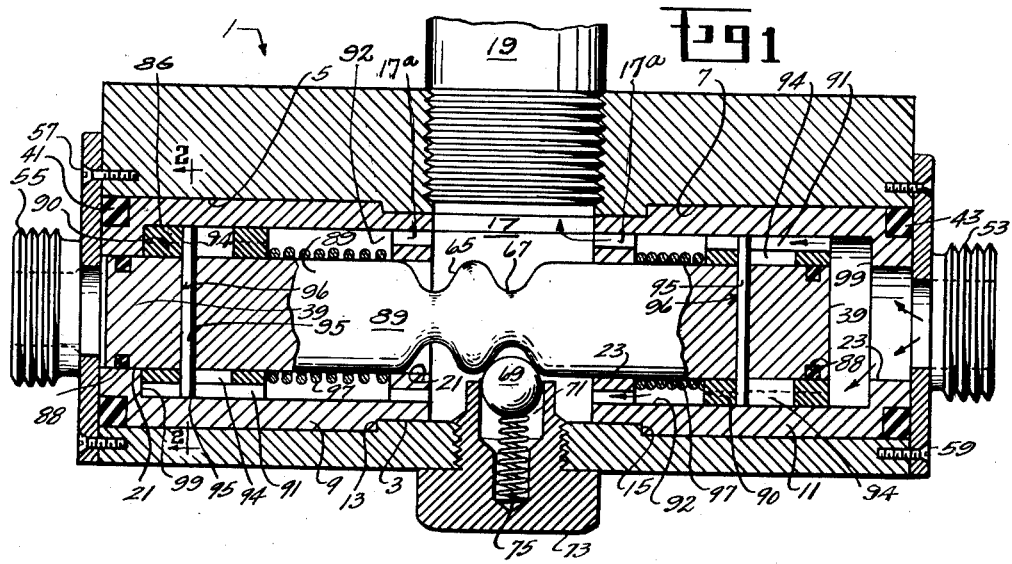
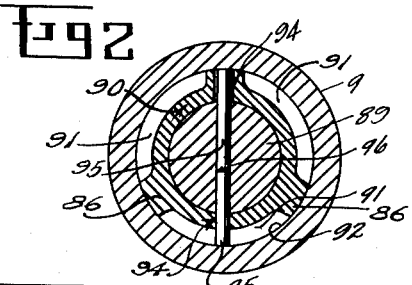
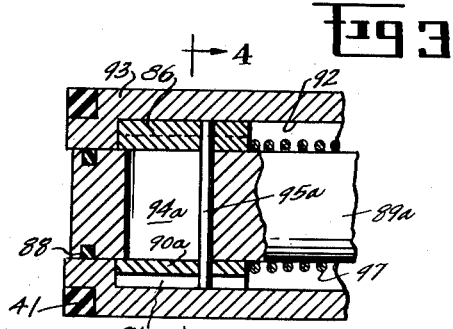
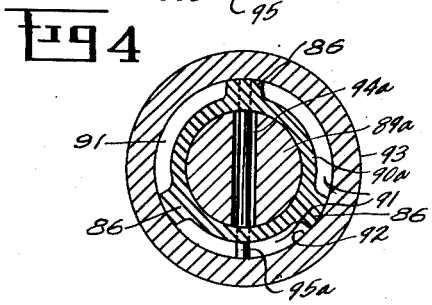
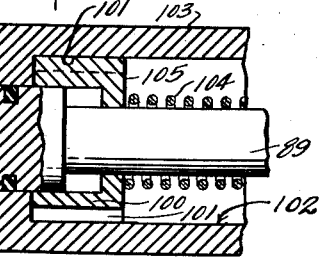
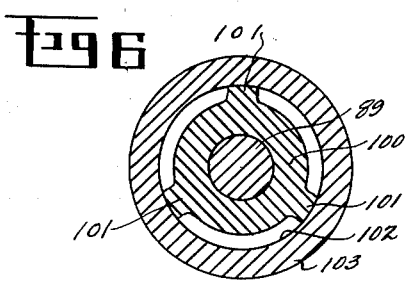
INVENTORS.
NICHOLAS BASHARK
DAVID GRANT
BY
ATTORNEYS

Patented Jan. 29, 1952

2,583,539

UNITED STATES PATENT OFFICE 2,583,539

VALVE PACKING CONSTRUCTION

Nicholas Bashark, Dayton, Ohio, and David Grant, Los Angeles, Calif.

Application June 5, 1946, Serial No. 674,406

1 Claim. (Cl. 251—75)

(Granted under the act of March 3, 1883, as amended April 30, 1928; 370 O. G. 757)

The invention described herein may be manufactured and used by or for the Government for governmental purposes without the payment to us of any royalty thereon.

This invention relates to improved sealing means and packing constructions for fluid operated mechanisms and more particularly to improved packing protective means for valves and resilient rod packings of the annular or ring type to prevent excessive wear and scuffing of the packing rings due to abrupt engagement or cutting of the ring by the closure valve or rod member incident to relative movement between the valve or rod and the packing means.

The use of resilient, elastic and non-metallic packing elements in hydraulic or fluid operated mechanisms such as pistons, valves, particularly of the poppet, shuttle and sleeve types, provides a simple and positive fluid sealing element for both low and high pressures with a greater simplicity of manufacture and design and correspondingly reduced production costs over conventional metallic packing seals. Many unsuccessful attempts have been made to utilize non-metallic, resilient, compressible and comparatively soft ring seals for hydraulic and fluid operated pistons, rods and shuttle type valves but due to the natures of the packing gland materials there has always been a tendency, or a probability, of packing failure due to the packing being "washed out" of its retaining grooves, particularly with high pressures and where the velocity of the fluid medium being controlled is high. Since these non-metallic resilient sealing rings have a tendency to expand when the sealing pressure is removed, due to movement of the piston, rod, or valve closure member from its closed sealing position to its seal disengaging fluid passing position the movement of the closure member back and forth between the respective closing and opening position and its alternate engagement with the expanded packing rings causes cutting or scuffing and a correspondingly rapid deterioration or failure of the packing gland.

It is therefore an object of the present invention to provide packing seal protective means for fluid sealing means of the annular resilient packing gland or ring type to prevent excessive wear, scuffing and damage of the packing gland during relative movement of a cooperating sealing element or valve into and out of sealing engagement with the packing.

Another object of the invention is the provision of corresponding packing seal holding means for engaging and holding a resilient packing gland in its operative position in one of two movable members during the engagement and disengagement between the members, including follower means having a packing gland supporting surface movable into and out of supporting engagement with the packing gland as one of the members moves out of or into engagement respectively with the other member.

A further object is the provision of a novel type of packing seal supporting follower construction for a piston or rod type fluid cutoff valve, in which the movement of a fluid controlling piston or rod valve into and out of sealing engagement with a resilient packing seal controls the corresponding movement of the follower member to packing seal disengaging and supporting position, preventing the expansion of the packing seal into the path of movement of the piston or rod closure member.

Other objects and advantages of the invention will become apparent from the following description, taken in connection with the accompanying drawings, in which reference characters refer to like parts in the several figures.

Fig. 1 is a longitudinal section view through a hydraulic shuttle valve structure illustrating one embodiment of the invention.

Fig. 2 is a cross sectional view taken in the plane indicated by the line 2—2 in Fig. 1.

Fig. 3 is a fragmentary longitudinal sectional view of a portion of a slight modification of the embodiment illustrated in Fig. 1.

Fig. 4 is a cross sectional view taken on line 4—4 in Fig. 3.

Fig. 5 is a fragmentary longitudinal sectional view of a further modification of the invention.

Fig. 6 is a cross sectional view taken in the plane indicated by line 6—6 of Fig. 5.

Referring to Fig. 1 of the drawings the reference numeral 1 indicates a dual or shuttle valve body having a cylindrical bore or opening 3 extending therethrough from end to end, and counterbored from each end to provide enlarged cylindrical portions 5 and 7 for the reception of the sleeve members 9 and 11, the shoulders 13 and 15 between the concentric counterbored portions and the central cylindrical bore forming stop shoulders for limiting the inward movement of the two sleeves 9 and 11.

A fluid outlet port 17 is formed intermediate the two counterbored portions 5 and 7, adapted to be connected to a suitable fluid discharge or delivery location by a conduit 19. The sleeves 9 and 11 are provided with cylindrical piston or shuttle valve receiving bores indicated at 21 and 23 to receive and guide a piston shuttle valve or rod closing member 89. The outer end portions 39 of the shuttle valve or piston member 89 are the same diameter, having a close sliding fit with the bores 21 and 23 in the sleeves 9 and 11 to permit the piston to freely shuttle into and out of the end portions of the bore, as seen in the right and left portions of Fig. 1.

The outer end of each of the sleeves 9 and 11 is rabbeted as indicated to receive an annular packing ring or gland 41—43 for sealing the space between the sleeves and the shuttle valve casing 1.

Suitable flanged nipples or coupling connector members 53 and 55 are secured to the opposite ends of the valve casing 1 over the outer ends of the longitudinal counterbores 5 and 7 by fastening members such as machine screws 57 and 59, the nipples 53 and 55 being adapted to be connected respectively to main or normal and emergency fluid supply lines.

The piston valve is provided with two inwardly tapering annular grooves formed in the periphery at opposite sides of its longitudinal center as best seen in Fig. 1 to provide annular saddle portions 65 and 67 for the reception of a spring pressed ball or detent member 69 disposed in a cylindrical guide passage 71 which is formed in a plug 73. The plug 73 is threadably received in a threaded opening formed in the valve casing 1, preferably in axial alignment with the discharge conduit 19, a coil spring 75 being provided for tensioning the ball detent 69 toward the shuttle valve or piston member 89, the detent being yieldably projected into one or the other of the saddle portions 65—67, retaining the shuttle valve in either the position shown in Fig. 1, interrupting the passage between the emergency fuel supply line and the discharge conduit, or in its other shuttle position interrupting the passage of fuel between the main fuel supply line which is connected to the nipple 53 and the discharge line 19.

When the piston and the followers 90 are in the position shown in Fig. 1 a pressure fluid, either liquid or pneumatic when admitted through the bore in the nipple 53, passes around the piston and the follower and out into the enlarged bore or central chamber and conduit 17, the fluid escaping through passages 17a at the inner ends of the sleeves 9 and 11, passing through the longitudinal spaces 91 between the splines or ribs 86 permitting free escape of the fluid while the bore of the follower 90 retains the resilient piston gland or ring 88 in its channel in the piston 89 in identically the same expanded position as it occupies when the piston is in engagement therewith in its operative fluid cutoff position.

The opposite or left-hand end portion 39 of the piston or rod closure member 89 is shown in sealing engagement with the left end portion of the bore 21 in valve guide or sleeve 9, efficiently sealing the space between the same and the piston to prevent the passage of fluid between the emergency fluid supply line nipple 55 and the discharge chamber 17. When the valve is in the position just described and the emergency line is not under sufficient pressure to shift the piston to the right against the holding pressure of the ball detent 69, the fluid pressure from the main or normal fluid supply is passing through the channel 91 between the ribs 86 of the follower 90 into the discharge chamber 17.

When the emergency fluid supply is to be used, pressure is applied to the fluid in this line through the bore in the nipple 55 and the pressure in the main or normal supply line is reduced or eliminated. When the pressure is sufficient to overcome the holding pressure of the detent spring 75 the fluid pressure on the left-hand end 39 of the piston 89 will cause the piston or rod closure 89 to be quickly snapped to the right, the right-hand end 39 of the shuttle valve piston and packing 88 moving into sealing engagement with the hight-hand end of the bore 23 in the sleeve 9 without allowing the packing gland 88 to expand or be scuffed by either the mouth of the bore 23 or the end of the follower 90. The expansion or sealing pressure of the packing gland 88 is thus transferred from the interior of the follower 90 to the interior surface of the bore 23 effectively preventing fluid flow from the main or normal supply line through the nipple 53 into the discharge chamber 17. The detent 69 having been cammed out of the annular dwell or saddle 67, exerts camming pressure on the inclined portion of the other dwell or saddle 65 and this pressure, together with the fluid pressure on the end of the piston, causes the piston to be quickly moved to the right, further following movement of the follower 90 being limited by its end engaging the shoulder 99 in the follower guide passage 92.

Fuel from the emergency line is now free to pass around the follower between the guide ribs 86, around the piston out into the fuel delivery chamber 17, and through the discharge conduit 19 to its delivery point. In the shuttling action of the valve or rod 89 the packing glands or rings 88 are both effectively supported and protected throughout the entire axial travel of the rod 89, the peripherial holding or sealing pressure of the resilient rings being transferred back and forth on the interior of the two bores 21 and 23 and the interior of the two follower members, thus preventing the packing rings from being engaged by the sharp ends or corners at the ends of the bores 21 and 23 permitting the use of extremely resilient and highly efficient compressible packing material in the packing rings while effectively preventing the scuffing and damage of more or less delicate and soft non-metallic packing rings, greatly prolonging the normal life of these packing glands and preventing the jamming or improper functioning of the piston closure valve member due to the expansion of its packing glands into the receiving bores 21 and 23.

The follower sleeve 90 is provided with diametrically opposite longitudinal slots 94 for the reception of a shifter pin or rod 95 carried by the rod closure, passing through a snug aperture 96 formed in the rod closure member 89, a coil or compression spring 97 being provided and disposed in the cylindrical bore or fluid chamber 92 to tension the follower sleeve to the left or toward the piston head that carries the ring packing 88.

When fluid pressure is applied to the left-hand end 39 of the piston or rod closure 89 moving the same to the right, the shifter pin 95 moves to the opposite ends of slots 94 as the packing 88 moves across the contiguous inner portion of the valve casing 9 and the follower sleeve 90, thus preventing any expansion of the packing gland or scuffing of the sealing surface of the packing ring by the edge of the closure, the spring 97 opposing and yieldably preventing simultaneous movement of the follower and the piston until the shifter pin 95 reaches and engages the right-hand ends of the slots 94. From this point the impingement of the ends of the shifter pins with the ends of the slots 94 in the follower sleeve 90 shifts this sleeve to the right, and away from the stop wall or shoulder 99, permitting a free passage of fluid from the fluid entrance into the bore 92.

The construction shown in Figs. 3 and 4 is a modification somewhat similar to the construction shown in Figs. 1 and 2, except that the slot 94a for the shifter pin 95a is formed in the closing member 89a and the shifter pin is rigidly carried in the shiftable packing supporting sleeve or follower member 90a instead of in the closure rod 89a. When the valve or closure rod 89a is moved to the right the shifter pin 95a and its supporting sleeve 90a will remain stationary until the packing gland 88 is shifted from surface engagement with the wall of the valve chamber to supporting engagement with the inner wall of the sleeve 90a, and engagement of the end of the slot 94a with the shifter pin causes the sleeve and closure rod to move together to their open or fluid passing position.

In Figs. 5 and 6 a follower member is indicated at 100, having the form of a cup member with radial exterior guide ribs 101 in guiding contact with the inner wall of an enlarged cylindrical chamber or passage 102, formed in the valve casing or cage 103, a compression coil spring 104 being interposed between the end 105 of the cup follower 100 and a wall or shoulder projecting inwardly from an inner wall of the valve chamber 102, this wall may be apertured to permit the passage of a pressure fluid therethrough to its delivery point.

An enlarged piston head or rod closure member is indicated at 106 having a flexible resilient packing ring or gasket 107 disposed in a suitable packing groove around the periphery of the head, the casing 103 and the follower both having cylindrical bores of identical diameters to alternately receive the piston head and its packing ring, the outer edge of the cup 100 and the shoulder between the enlarged chamber 102 and the cylindrical bore for the piston head 106 being formed in parallel planes, preferably transverse to the longitudinal axis of the rod 89, to permit the edge or entrance to the bore in the follower cup and the entrance bore in the casing for the head 106 to be in contiguous flush contacting relation when the piston valve is in its closed and fluid sealing position as shown in Fig. 5.

Where pressure is applied to the piston head 106 at the left-hand end of the rod 89, the piston and its packing will move across the contiguous edges of the bore in the follower cup 100 and the bore in the casing until the right-hand end of the piston head strikes the bottom of the follower cup 100, continued movement of the piston shifts the follower to the right against the action of the spring 104, permitting the piston actuating fluid to pass around the piston head 106 and between the longitudinal guide ribs 101 on the cup follower 100 into the enlarged chamber. When the piston head is returned to its left or fluid cutoff position the spring 104 will shift the follower 100 with the piston, with the packing ring 88 supported inside of the cup, until the movement of the follower cup is arrested by the aforementioned stop shoulder. The piston will continue its left-hand movement and its resilient packing ring will move across the contiguous cup follower and casing surfaces, without expansion or scuffing engagement, to its fluid sealing position as shown in Fig. 5.

In Figs. 3 to 6 the valve casing or cage is of a cylindrical or sleeve type that may be mounted in a valve casing structure like the casing 1 in Fig. 1, having a straight or axial bore, and be retained in the bore by flanged normal and emergency fluid inlet nipples 53 and 55 as in Fig. 1. The central portion of the closure rod or piston in these latter figures may also be provided with detent receiving grooves or saddles 65 and 67 like the rod 89 in Fig. 1, and the valve rods, follower members and the valve casings as shown in these figures, may also be duplicated at their other or broken away portions.

While this invention has been described in conjunction with several specific embodiments, for the purpose of illustration, what we claim as novel and desire to secure by Letters Patent is:

In the packing seal retainer construction; a valve-like body having a cylindrical bore extending therethrough formed with an enlarged concentric cylindrical guide chamber located intermediate the ends of the bore; means for introducing a pressure fluid into one end of the guide chamber; said guide chamber having spaced parallel end walls disposed perpendicular to the longitudinal axis of the bore; a sleeve-like cylindrical follower member concentrically disposed in said guide chamber for axial movement, having longitudinally extending guide flanges formed thereon equally spaced about its exterior in slidable supporting relation with the interior of the guide chamber intermediate its ends, the spaces between the flanges forming plural pressure fluid conduit passages between the follower and the interior wall of the guide chamber; said follower having a concentric cylindrical guide bore extending therethrough similar in diameter to the first mentioned cylindrical bore, and having spaced parallel end faces disposed perpendicular to the axis of the last mentioned cylindrical bore, spring means biasing said follower toward the end of the enlarged chamber adjacent the pressure fluid introducing means, interposed between the end of the enlarged chamber opposite that having the pressure fluid introducing means therein and the adjacent end of the follower; an actuating rod concentrically disposed in said bore for axial movement relative to the follower and body; a valve closure head concentrically formed on the end of the rod having a cylindrical end portion slidably disposed within the follower and formed with a packing ring receiving groove; abutment stop means between the follower and the rod for limiting relative movement therebetween by the biasing spring means in one direction, movement of the follower in the opposite direction being limited by abutment engagement of the end thereof with the end wall of the enlarged chamber; an annular resilient packing ring disposed in the groove formed in the end portion of the valve closure head and retained therein by the follower when in one position, and released by the follower and retained therein by the first mentioned cylindrical bore, incident movement of the follower into abutting engagement with the end of the enlarged chamber and continued movement of the closure head into the first mentioned bore.

NICHOLAS BASHARK.
DAVID GRANT.

REFERENCES CITED

The following references are of record in the file of this patent:

UNITED STATES PATENTS

| Number | Name | Date |
|---|---|---|
| 382,469 | Hawthorne et al. | May 8, 1888 |
| 969,803 | Pollack | Sept. 30, 1910 |

FOREIGN PATENTS

| Number | Country | Date |
|---|---|---|
| 693,355 | France | of 1930 |